United States Patent [19]

Welkey

[11] Patent Number: 4,840,409
[45] Date of Patent: Jun. 20, 1989

[54] SWIVEL FLOW LINE CONNECTOR

[75] Inventor: Joseph J. Welkey, Houston, Tex.

[73] Assignee: Taper-Lok Corporation, Houston, Tex.

[21] Appl. No.: 192,330

[22] Filed: May 5, 1988

[51] Int. Cl.$^4$ .............................................. F16L 27/04
[52] U.S. Cl. .................................. 285/167; 285/261; 285/271; 277/169; 277/170
[58] Field of Search ............... 285/261, 263, 271, 167, 285/163, 166, 160, 332.1, 332.2, 334.1, 334.4, 378, 175, 266, 270, 335, 368, 363; 277/169, 170, 171, 168, 100, 207 A

[56] References Cited

U.S. PATENT DOCUMENTS

| | | | |
|---|---|---|---|
| 592,681 | 10/1897 | Barnhart | 285/261 |
| 1,187,642 | 6/1916 | Milz | 285/261 |
| 1,806,710 | 5/1931 | Ross, Jr. | 285/334.1 |
| 2,687,229 | 8/1954 | Laurent | 285/334.4 |
| 3,178,207 | 6/1960 | Fox et al. | |
| 3,477,748 | 11/1969 | Tinsley | |
| 3,746,372 | 7/1973 | Hynes et al. | |
| 3,860,271 | 1/1975 | Rodgers | |
| 3,874,706 | 4/1975 | Arnold | 285/261 |
| 4,012,060 | 3/1977 | Reneau | |
| 4,068,864 | 1/1978 | Herbert et al. | |
| 4,082,320 | 4/1978 | Weinhold | |
| 4,129,306 | 12/1978 | Konno et al. | |
| 4,153,281 | 3/1979 | Ahlstone | |
| 4,180,285 | 12/1979 | Reneau | |
| 4,195,865 | 4/1980 | Martin | |
| 4,381,871 | 5/1983 | Dopyera et al. | 285/261 |
| 4,452,474 | 6/1984 | Hagner | 285/334.1 |
| 4,484,771 | 11/1984 | Schulz | 285/368 |
| 4,618,173 | 10/1986 | Dopyera et al. | 285/261 |
| 4,648,632 | 3/1987 | Hagner | |

FOREIGN PATENT DOCUMENTS 591109 1/1934 Fed. Rep. of Germany ...... 285/261

Primary Examiner—Randolph A. Reese
Assistant Examiner—Anthony Knight
Attorney, Agent, or Firm—Bernard A. Reiter; Daniel N. Lundeen

[57] ABSTRACT

A swivel flow line connector is disclosed for use in misaligned connections. The connector includes male and female flanged tubular members and a seal ring positioned therebetween. The male member and the seal ring have mating annular spherical surfaces which are respectively convex and concave. The female member and the seal ring have mating frustoconical tapered surfaces, but the outside diameter of the seal ring is slightly larger than the inside diameter of the female member frustoconical surface. Prior to drawing the male and female members together by bolting respective flanges thereof, the convex male member surface is pivotably engaged with the concave seal ring surface for alignment of the members in the desired swiveled position. Upon drawing the members together by tightening the flange bolts, the seal ring is radially compressed by axial displacement of the female member frustoconical surface with respect to the corresponding tapered surface of the seal ring. This radial compression effects a seal between the male and female members and the seal ring, and locks the male and female members into the swiveled alignment.

41 Claims, 7 Drawing Sheets

SWIVEL FLOW LINE CONNECTOR

BACKGROUND OF THE INVENTION

1. Field of the Invention

The present invention relates to flow line closures or connectors for sealingly connecting tubular members which are pivoted or misaligned with respect to each other.

2. Background

In the field of fluid handling, such as for example in marine pipelines, there have been developed a number of connection or closure arrangements for connecting flow tubes or conduits. In certain applications, such connectors must seal adjoining tubular members which are misaligned, or in other words, such members are not generally coaxial and may need to be joined at a slight angle relative to each other. Such connectors are often referred to as misaligning flanges, ball connectors, and swivel couplings, to name a few.

These known ball connectors generally have a first tubular member with an annular convex sealing surface and a second tubular member with an annular concave sealing surface. The sealing surfaces are generally drawn together by opposed flanges on each tubular member which are bolted together to form a seal, typically with an O-ring or gasket disposed therebetween. One or both of the flanges is typically pivotable with respect to the tubular member on which it is mounted. The concave and convex sealing surfaces are typically spherically shaped to permit the tubular members to be swiveled or pivoted so that the tubular members can be sealingly connected without coaxial alignment. Such an arrangement is particularly advantageous in subsea or marine environments where pipelines cannot be laid substantially in alignment, or where it may become necessary to repair portions of the pipeline which have been displaced by ship anchors, for example, or other forces.

One problem with such conventional swivel couplings is that the tubular members may need to be axially displaced to draw the sealing surfaces of the swivel coupling into engagement. As a result, it is often difficult to establish the proper torque loadings on the flange bolts since some of the loading is necessary to draw or hold the tubular members themselves, in addition to that required to compress a sealing element between the concave-convex sealing surfaces to effect a fluid-tight seal therebetween. As a consequence, a leak may form because of the uneven or non-uniform compression of the sealing element.

Another problem with such swivel couplings heretofore used is that forces imparted to the adjacent tubular members after installation of the coupling tend to induce a bending moment at the joint which may also cause pivoting or swiveling of the adjoining tubular members connected thereby and eventual leaking of the seal due to damage to the sealing element caused by movement thereof on the sealing surface and/or uneven compression of the sealing element.

One attempt at overcoming these problems is the fluid actuated pipe connection described in U.S. Pat. No. 3,874,706. In this connector, the female portion of the coupling element is provided with a separate hydraulic actuated cam member for locking the coupling, in addition to a hydraulically actuated O-ring for effecting a fluid seal between the male and female members of the connection.

Another attempt at overcoming these problems is the swivel coupling element described in U.S. Pat. Nos. 4,381,871 and 4,618,173. The swivel coupling element disclosed therein includes an annular mounting flange having a leading end for seating on a seating face of a conventional flange and a trailing end in which an annular concave spherical surface is formed. This coupling also includes a tubular member having an end with a complementary convex annular spherical surface to cooperate with the concave surface of the mounting flange, and an annular flange for securing the conventional flange to the flange of the male tubular member with the sealing flange positioned therebetween. The concave-convex sealing surfaces of this coupling are sealed by a metal O-ring placed in an annular recess formed in either or both of the sealing surfaces. To ensure proper compression of the O-ring gasket, the male member annular flange is separately bolted to the mounting flange with a separate set of bolts prior to bolting the assembly to the conventional flange. Since the male member in this arrangement is otherwise free to pivot with respect to its annular flange, the male member is locked into position with respect to the annular flange by the provision of corresponding opposed roughened surfaces formed on respective trailing surfaces thereof.

A disadvantage of such prior art connections is the complexity of manufacture and installation, and a large number of parts needed to effect the closure. This tends to add greatly to the manufacturing and installation costs thereof, and also to multiply the sources for failure and leakage.

Accordingly, there is a need for a swivel flow line connector having simplicity of manufacture and installation, which properly seats a sealing element regardless of the forces required to position the adjacent tubular members thereof, and which resists pivoting or swiveling following connection which might consequently damage the sealing element.

SUMMARY OF THE INVENTION

The present invention provides a swivel flow line connector which employs an annular seal ring having a curved inner surface for engaging an annular convex exterior seating surface of like curvature of a male tubular member and a frustoconical outer surface for radial compression by an outwardly tapered frustoconical interior seating surface of like slope of a female tubular member. The generally matching sphericity of the seal ring inner surface and the male member convex surface allow the connector to be joined with the tubular members pivoted or swiveled with respect to each other while the spherical surfaces remain sealingly aligned. The seal is generally effected by urging the male and female tubular members toward each other, such as, for example, by bolting together annular flanges respectively operatively associated with the male and female members. The generally matching slopes of the outer frustoconical seal ring surface and the interior female member frustoconical surface obtain radial compression of the seal ring, upon urging of the male and female members toward each other, thereby effecting a seal between the female member interior surface and the seal ring outer surface and the seal ring inner surface and the male member exterior surface, and locking the tubular members pivotedly in alignment with respect to each other.

In one aspect, the invention provides a seal ring especially adapted for use in a flow line swivel connection. The seal ring is annular and includes an inner concave surface, an outer frustoconical surface, a lip extending radially from the outer surface adjacent a maximum outside diameter thereof, an annular end surface extending from a minimum inside diameter to a minimum outside diameter, and an axial thickness measured from the minimum outside diameter to the maximum outside diameter of the outer surface. The angle of the slope of the outer surface with respect to a longitudinal axis is generally less than the angle of a line tangent to the inner surface with respect thereto along the extent of the axial thickness. The seal ring is adapted to provide a seal by radial compression thereof against an exterior spherical or elliptical sealing surface with a curvature generally matching that of the seal ring inner surface, as in a male tubular member with an end portion including the same. The radial compression is obtained by urging an interior frustoconical surface with a slope and axial thickness generally matching that of the seal ring outer surface, but with a maximum inside diameter less than that of the seal ring outer surface, as in a female tubular member with an end portion including the same, toward the exterior spherical surface to axially displace the interior frustoconical surface with respect to the seal ring outer surface to position the maximum inside diameter of the interior frustoconical surface adjacent the seal ring lip. In such an application, the seal ring lip desirably serves as visual indicia of a proper axial displacement of the interior frustoconical surface of the female member with respect to the outer surface of the seal ring.

In another aspect, the invention provides apparatus for making a swiveled flow line connection which includes a male member, a female member, an annular seal ring and means for urging the male and female members toward each other. The male member has an annular end portion with a curved convex exterior sealing surface. The exterior surface has a maximum outside diameter and a terminus adjacent a minimum outside diameter of the surface. The female member in cooperation with the seal ring is generally matingly pivotable with the male member and has an annular end portion with an outwardly tapered frustoconical interior surface. The interior surface has a slope with respect to a longitudinal axis of the female member less than that of a line tangent to the male end portion exterior surface. The frustoconical interior surface terminates at a maximum inside diameter thereof. A shoulder extends radially inwardly from a minimum inside diameter of the interior surface. The seal ring has a frustoconical outer surface with a slope and axial extent substantially equal to that of the female member end portion interior surface for sealing engagement therewith. The seal ring has an inner concave annular surface with a curvature substantially equal to that of the male member end portion exterior surface for sealing engagement therewith. A lip extends radially outwardly from the seal ring outer surface adjacent a maximum outside diameter thereof. The seal ring outer surface maximum outside diameter is greater than the female member end portion interior surface maximum inside diameter. The maximum inside diameter of the seal ring inner surface is less than the male member end portion exterior surface maximum outside diameter. The means for urging the male and female members toward each other in pivoted alignment, in operation, serves to axially displace the female member end portion interior surface relative to the seal ring outer surface to position the maximum inside diameter of the female member end portion interior surface adjacent the seal ring lip. This displacement, in turn, causes the seal ring to become radially compressed to effect a fluid tight seal between the male and female members, and to lock the male and female members into swiveled alignment. The urging means may include opposed annular flanges fixedly and/or slidably secured around the respective male and female members.

In a further aspect, the invention provides a swiveled flow line connection which includes a male member, a tubular female member and an annular seal ring. The male member has an annular end portion with a curved convex exterior surface, a maximum outside diameter and a minimum outside diameter. The female member in cooperation with the seal ring is generally matingly pivoted with respect to the male member. The female member has an annular end portion with an outwardly tapered frustoconical interior surface with a slope with respect to the longitudinal axis of the female member less than that of a line tangent to the male end portion exterior surface. The frustoconical interior surface terminates at a maximum inside diameter thereof at a radially outwardly extending face. The interior surface extends axially to a radially inwardly extending shoulder at a minimum inside diameter of the interior surface. The annular seal ring is radially compressed between the male member end portion exterior surface and the female member end portion interior surface. The compressed seal ring has a frustoconical outer surface with a slope and axial extent substantially equal to that of the female member end portion interior surface and is in sealing engagement therewith. The seal ring has a concave inner annular surface with a curvature substantially equal to that of the male member end portion exterior surface and is in sealing engagement therewith. A lip extends radially outwardly from the seal ring outer surface adjacent a maximum outside diameter thereof and abuts the female member end portion outwardly extending face. An annular end surface extends radially between the inner and outer seal ring surfaces at minimum diameters thereof in abutment with the female member end portion radially inwardly extending shoulder. The seal ring outer surface has a maximum outside diameter in a relaxed condition greater than the female member end portion interior surface maximum inside diameter. A maximum inside diameter of the seal ring inner surface is less than the male member end portion exterior surface maximum outside diameter. Means are provided for maintaining the relative axial disposition of the male and female member end portions and the seal ring. The maintaining means may include opposed annular flanges fixedly and/or rotatably attached to the respective male and female members adjacent the end portions thereof.

In a still further aspect, the invention provides apparatus for making a swiveled flow line connection which includes an annular ball member, first and second tubular female members, first and second respective seal rings, and means for urging the female members toward each other with the ball member therebetween. The ball member has longitudinally opposite first and second end portions. A peripheral rim is positioned between the ball member end portions transverse to a longitudinal axis of the ball member. Each ball member end portion has a convex exterior sealing surface with a uniform radius of curvature. Each ball member exterior sealing surface has a maximum outside diameter adjacent the peripheral rim, and a terminus adjacent a minimum outside diameter thereof. Each female member has a respective annular end portion generally matingly pivotable with the first and second ball member end portions. Each of the female member end portions has an outwardly tapered frustoconical interior surface with a slope with respect to a longitudinal axis thereof which is less than that of the respective ball member end portion exterior surface. Each frustoconical interior surface terminates at a radially outwardly extending face adjacent a maximum inside diameter of the surface. Each frustoconical surface extends axially to a respective radially inwardly projecting shoulder adjacent a minimum inside diameter of the surface. Each seal ring has a frustoconical outer surface with a slope substantially equal to that of its respective female member end portion interior surface for sealing engagement therewith. Each seal ring has an inner concave annular surface with a uniform radius of curvature substantially equal to that of its respective ball member end portion exterior surface for sealing engagement therewith. A lip extends radially outwardly from each seal ring outer surface adjacent a maximum outside diameter thereof. Each seal ring outer surface maximum outside diameter is greater than its respective female member end portion interior surface maximum inside diameter. A maximum inside diameter of each seal ring inner surface is less than its respective ball member end portion exterior surface maximum outside diameter. The means for urging the female members toward each other in pivoted alignment in operation, serves to axially displace each female member end portion interior surface relative to its respective seal ring outer surface to position the maximum inside diameter of the respective female member end portion interior surface adjacent the seal ring lip. This displacement causes each seal ring to become radially compressed to effect a fluid tight seal between the ball and each female member, and to lock the female members into swiveled alignment with the ball member. The urging means may include opposed annular flanges fixedly and/or rotatably secured around the respective female members.

DESCRIPTION OF THE PREFERRED EMBODIMENTS

Figure 1:
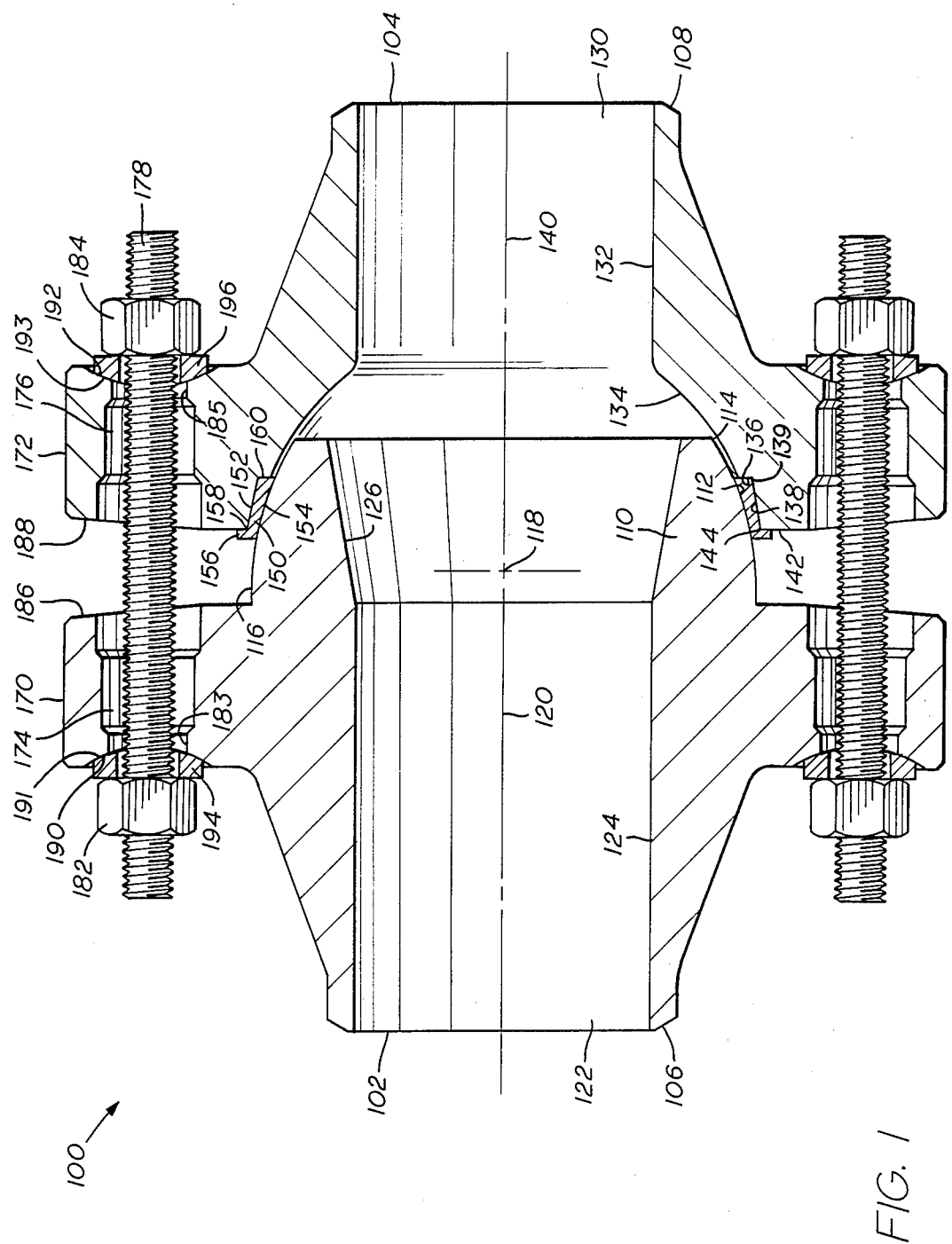
FIG. 1 is an axial section of a swivel flow line connector according to the present invention in which the male and female members thereof are coaxially aligned.

The apparatus for making a swivel flow line connection according to the present invention generally includes a male member, a female member, and an annular seal ring disposable therebetween. Each male and female member is typically tubular, each having a central bore formed therein coaxial with a longitudinal axis of each member for the conduction of fluid therein. Each of the tubular members has a respective end portion which is generally matingly pivotably engageable with the end portion of the other member, in cooperation with the seal ring. Typically, each tubular member can be connected at an end opposite the interengaged end portion to another adjacent tubular member in a flow line by conventional connecting joints such as, for example, welding, standard raised or flat face flanges or the like.

The male tubular member has an end portion which has a generally coaxial convex annular sealing surface. The sealing surface has generally spherical curvature which is substantially uniform. The sealing surface of the male member end portion extends axially from a minimum outside diameter adjacent a terminus of the male member end portion to a maximum outside diameter. The exterior sealing surface of the male member end portion may terminate at an edge where it meets with the central bore, but preferably terminates at a radial face extending from the maximum inside diameter of the central bore to the minimum outside diameter of the sealing surface.

The female tubular member has an end portion in which a frustoconical recess is formed. The frustoconical recess has a maximum inside diameter adjacent a radially outwardly extending face at a terminus of the female member end portion. The frustoconical surface extends axially from the face to a minimum inside diameter adjacent a radially inwardly projecting shoulder. The shoulder of the female member end portion terminates at the central bore of the female member. The frustoconical surface tapers radially outwardly with respect to a longitudinal axis of the female tubular member to present an interior sealing surface. The interior surface is sloped with respect to the longitudinal axis of the female member at an angle which is less than that of a line tangent to the exterior spherical surface of the male member end portion. The slope of the interior surface is preferably tapered with respect to the longitudinal axis of the female member at an angle less than about 20° and more preferably about 10°, or less in some instances.

The seal ring is generally annular and is provided with an outer frustoconical surface having a slope and an axial extent corresponding to that of the interior frustoconical surface of the female member. The inner surface of the seal ring is spherically curved and has a radius of curvature corresponding to that of the exterior surface of the male member end portion. A lip extends radially outwardly from the outer surface of the seal ring adjacent the maximum outside diameter thereof. The seal ring also has a radial face which extends from the inner surface of the seal ring adjacent a minimum inside diameter thereof to the outer surface of the seal ring adjacent a minimum outside diameter thereof.

The seal ring preferably has a minimum outside diameter on the outer surface thereof which, in a relaxed condition, i.e., prior to assembly of the flow line connection, is larger than the minimum inside diameter of the interior frustoconical surface of the female member end portion, but less than the maximum inside diameter of the interior frustoconical surface of the female end portion. Similarly, the inner surface of the seal ring has a minimum inside diameter which is greater than the minimum outside diameter of the spherical exterior surface of the male member end portion, and a maximum inside diameter which is less than the maximum outside diameter of the male member end portion exterior spherical surface.

The apparatus also includes means for urging the male and female members towards each other with the seal ring disposed therebetween. Lugs or flanges radially extending outwardly adjacent each respective male and female end portion are preferably used for this purpose. These may be conveniently drawn together by conventional bolts or studs which extend through perforations or bores formed in the mutually opposed flanges or lugs by means of threaded nuts on either end thereof.

In employing the apparatus to form the flow line connection according to the present invention, the seal ring may be lightly pressed, e.g. by hand, into the female member end portion with the outer frustoconical surface of the seal ring in engagement with the interior frustoconical surface of the female member end portion. This light pressing serves to cam the seal ring into place in the female member end portion recess so that it will be properly positioned during connection of the joint. With the seal ring positioned in the female member end portion, the male and female tubular members are brought matingly into position. Since the sphericity of the inner surface of the seal ring corresponds to that of the exterior surface of the male member end portion, the male and female tubular members may be readily pivoted or swiveled with respect to each other.

When the tubular members are in the desired alignment or misalignment, the flanges or other means for urging the male and female tubular members toward each other are employed to tighten the connection. This urging causes the female member to be axially displaced with respect to the seal ring and the male member. This displacement causes the interior frustoconical surface of the female member end portion to move relative to the outer frustoconical surface of the seal ring until the radially outwardly extending face of the female member end portion adjacent the maximum inside diameter of the sealing surface is in abutment with the lip of the annular seal ring. Since the axial extent of the outer surface of the seal ring corresponds to that of the interior frustoconical surface of the female member end portion, the abutment of the lip of the seal ring with the face of the female member end portion adjacent the maximum inside diameter thereof thus indicates that the radial face of the seal ring opposite therefrom will be in abutment with the radially inwardly extending shoulder of the female member end portion adjacent the minimum inside diameter of the interior sealing surface thereof.

It is preferred that the abutment of the seal ring lip with the face of the female member end portion should be visible, such as, for example, by viewing the same between the flanges of the respective male and female end portions. This permits the desired amount of radial compression or camming of the seal ring by the interior surface of the female member end portion to effect a fluid tight seal between the seal ring and the end portions of both the female and the male tubular members. Thus, it is not necessary to rely on torque loadings on the bolts with which the flanges are drawn together which in many instances may be influenced by axial displacement or other forces on the tubular member in addition to the force required to compress the seal ring between the sealing surfaces of the male and female end portions. The radial compression of the seal ring further serves to fix the male and female tubular members in the desired pivoted or swiveled alignment and to inhibit further movement thereof which might otherwise result as a consequence of external forces on the flow line.

In addition to the radial compression of the seal ring obtained by the axial displacement of the interior frustoconical female member end portion to effect the fluid tight seal, the seal ring is generally further compressed by fluid pressure in the tubular member. This fluid pressure acts on the radial face of the seal ring which is in fluid communication therewith. This pressure tends to further wedge the seal ring between the frustoconical interior sealing surface of the female member end portion and the exterior spherical sealing surface of the male member end portion since the inner and outer seal ring surfaces are tending to converge toward each other in the general axial direction of the force exerted on the seal ring by the internal fluid pressure.

The central bore of the male tubular member preferably diverges radially outwardly at the end portion at which the exterior spherical sealing surface is located. This radial divergence preferably results in the inside bore of the male member having a frustoconical surface at the end portion which has a taper with respect to the longitudinal axis of the male member which corresponds to the maximum angle of misalignment for which the connection is designed. This radial divergence serves to minimize any pressure losses incident to the flow of a fluid therethrough. If desired, a similarly radially outwardly diverging section may be formed in the central bore of the female member adjacent the end portion with the frustoconical recess, or on both of the mating end portions of the male and female members. However, the desirability of the radially outwardly diverging sections should be considered in conjunction with the strength required by the tubular members and the lessening of the thickness which results from the presence of a radially outwardly diverging central bore.

It is readily appreciated that the dimensions of the seal ring should be such that when the tubular members of the connection are in maximum misalignment for which the connection is designed that the inner sealing surface of the seal ring is in engagement with the exterior sealing surface of the male member around the entire periphery of the latter. Thus, in the maximum misaligned position, when the maximum inside diameter of the inner surface of the seal ring at one side thereof is adjacent the maximum outside diameter of the exterior sealing surface of the male member end portion, the minimum inside diameter of the inner surface of the seal ring is preferably spaced slightly away from the minimum outside diameter of the exterior sealing surface of the male member end portion at the opposite side of the connection.

When flanges are used to draw the male and female members into pivoted alignment with the seal ring positioned therebetween, it is important to note that the misalignment of the flanges and/or the bolts with which they are drawn together must be taken into account. Preferably, the flanges associated with the male and/or female members are fixed in a position transverse to the respective longitudinal axes of the male and female tubular members, i.e., so that the flanges are not pivotable with respect to the tubular members. However, in some instances it may be desirable to employ flanges which are rotatable with respect to the tubular member with which it is associated to facilitate alignment of the bolt holes of the flange of one tubular member with those of the flange of the other tubular member. Preferably, the bolts connecting the flanges will be pivotable in the bolt holes thereof to an extent corresponding to full misalignment of the male and female tubular members in any direction.

In order to facilitate swiveling of the female and male tubular members with respect to each other, it is readily appreciated that the central bore of the female member end portion should not interfere with pivoting movement against the spherical external surface of the male member end portion. Preferably, the female member end portion includes a concave annular spherical surface extending radially inwardly from the shoulder at which the interior frustoconical surface terminates. This concave surface should have a radius of curvature generally corresponding to that of the exterior sealing surface of the male member end portion, and preferably slightly larger than the male member end portion radius of curvature so that there will be no contact between the concave surface of the female member end portion and the convex exterior sealing surface of the male member end portion when the connection is tightened. The difference between the radii of curvature of the female member end portion convex surface and the male member end portion exterior sealing surface will thus result in a gap therebetween. This gap corresponds to the difference in the radial dimension of the female member end portion sealing surface adjacent the interior frustoconical surface minimum inside diameter and that of the radial face of the seal ring.

Figure 2:
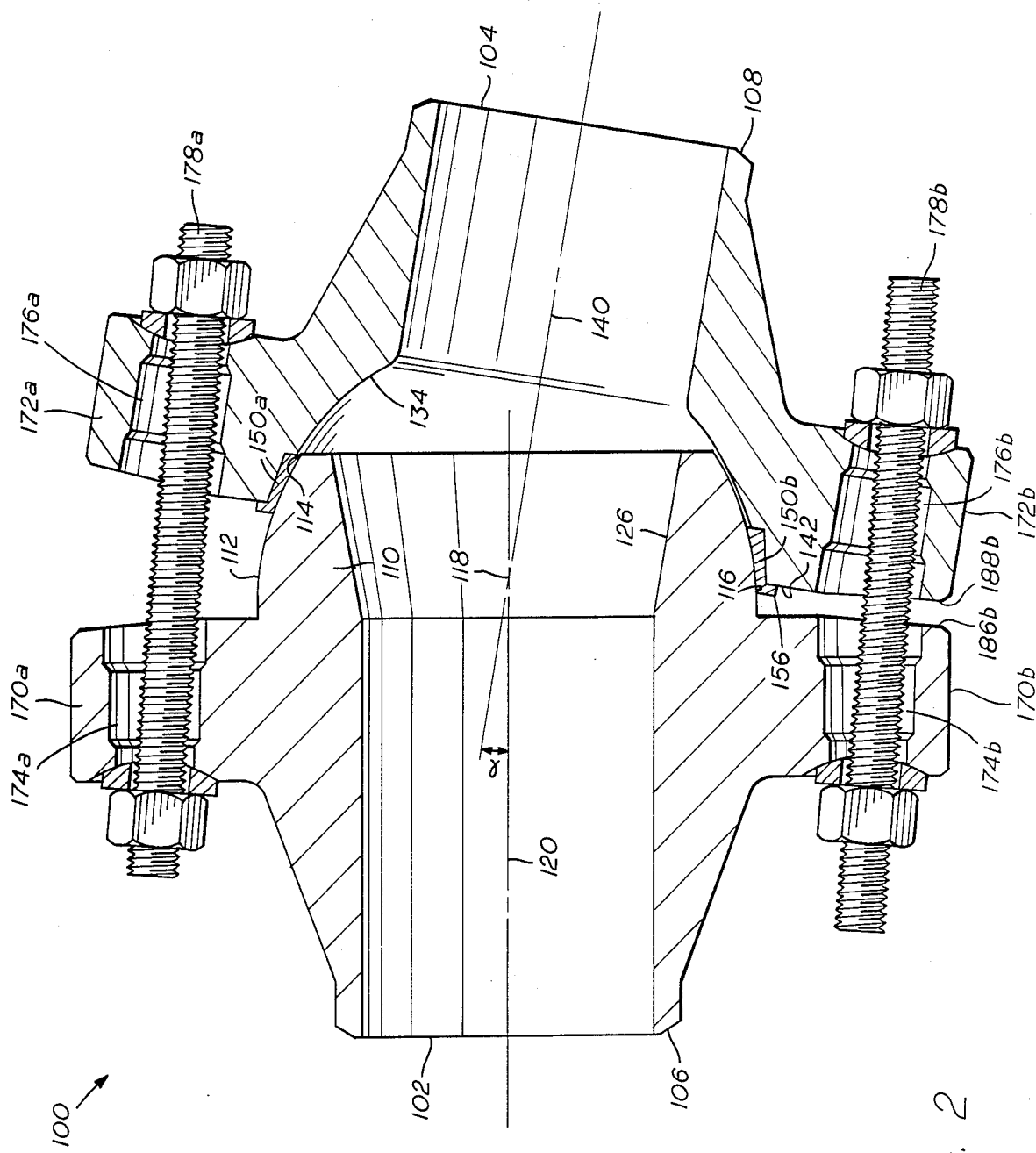
FIG. 2 is an axial section of the flow line connector of FIG. 1 in which the male and female members thereof are axially misaligned.

Referring now to the embodiment seen in FIGS. 1 and 2, the swivel flow line connector 100 includes male tubular member 102 and female tubular member 104 generally matingly aligned therewith. The male member 102 and the female member 104 have respective distal ends 106 and 108 for connection to adjacent tubular members (not shown), e.g. in a pipeline. The swivel connector 100 may thus be placed in a flow line in a conventional manner, for example, by welding or with conventional raised or flat face flange connections. The male member 102 is provided with an end portion 110 proximal the female member 104. The end portion 110 is provided with an annular, spherically shaped sealing surface 112 which extends axially from a minimum outside diameter 114 to a maximum outside diameter at 116. The exterior surface 112 has a sphericity corresponding to a radius of curvature from point 118 disposed along axis 120 of the tubular member 102. The male tubular member 102 is provided with a generally central bore 122 having a portion 124 of generally uniform inside diameter and a radially outwardly diverging portion 126 along the end portion 110.

The female tubular member 104 has a central bore 130 with a portion 132 adjacent the distal end 108 having a generally uniform inside diameter and a radially outwardly diverging face 134 proximal to the end portion 110 of the male member 102. The face 134 is spaced slightly apart from the surface 112 and is shown in FIGS. 1 and 2 as spherically concave with a radius of curvature generally complementary to that of the surface 112, but it is contemplated that other diverging faces may be used as long as such faces do not interfere with pivoting of the member 104 with respect to the member 102 on the face 112. A shoulder 136 extends radially outwardly from the face 134 to a frustoconical surface 138. The frustoconical surface 138 tapers radially outwardly with respect to the axis 140 of the tubular member 104. The interior surface 138 is sloped with respect to the axis 140 at an angle which is less than that of a line tangent to the surface 112 along the axial extent of the surface 138 from a minimum inside diameter 139 to a maximum inside diameter 144. A face 142 extends radially outwardly from the interior surface 138 adjacent the maximum inside diameter 144 of the surface 138.

An annular seal ring 150 is disposed between the exterior surface 112 of the male member 102 and the interior frustoconical surface 138 of the female member 104. The seal ring 150 has an outer surface 152 which is frustoconical and has a slope with respect to the axis 140 of the female member 104 and an axial extent corresponding to that of the interior frustoconical surface 138 of the female member 104. An inner spherical surface 154 is opposite from the surface 152 of the seal ring 150. The spherical surface 154 has a radius of curvature corresponding to that of the surface 112 of the male member 102. A lip 156 extends radially outwardly from the surface 152 adjacent maximum outside diameter 158 thereof. The lip 156 abuts the face 142 of the female member 104. The seal ring 150 is also provided with a radial face 160 in abutment with the shoulder 136 of the female member 104. The face 160 has a radial dimension which is at least as great as that of shoulder 136, preferably slightly larger than that of the shoulder 136 so that the sum of the radius of curvature of surface 112 plus the difference between the radial dimension of the face 160 and the shoulder 160 is approximately equal to the radius of curvature of the face 134.

Respective annular flanges 170, 172 extend radially outwardly from the male and female members 102, 104 and are fixedly attached thereto. The flanges 170, 172 are opposed from each other and each is provided with respective bores 174, 176 generally in mutual register for receiving a bolt 178. Generally, a plurality of such bores 174, 176 and bolts 178 are employed. Each bolt 178 is generally threaded at opposite ends thereof for threadedly receiving respective nuts 182, 184 which are tightened to urge the male member 102 and the female member 104 towards each other. The bores 174, 176 are tapered radially outwardly stepwise or gradually (not shown) along their respective axial dimensions with the smallest bore portions 183, 185 adjacent the nuts 182, 184 with the bores generally radially enlarging along their axial dimension toward proximally opposed flange faces 186, 188 of the male and female members 102, 104, respectively. The bores 174, 176 are further provided with radially outwardly diverging concave bolt seating faces 190, 192, respectively, of spherical curvature matching that of spherically shaped leading surfaces 191, 193 of nut collars 194, 196 provided adjacent each respective nut 182, 184.

Figure 5:
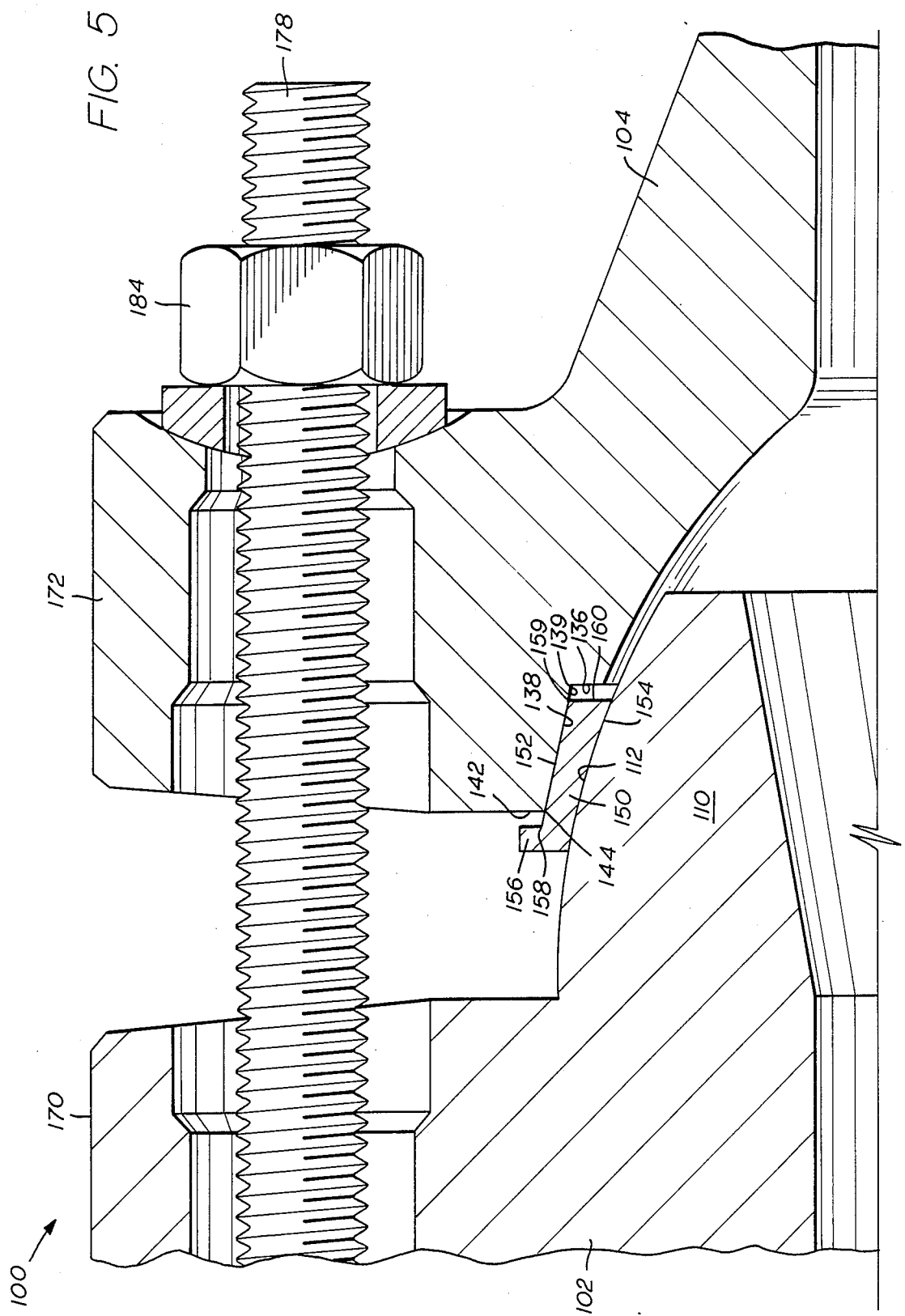
FIG. 5 is an enlarged partial axial section of apparatus according to the present invention for making the flow line connector of FIG. 1.

In a relaxed condition as illustrated in FIG. 5 in which like parts are numbered alike, maximum outside diameter 158 of surface 152 of seal ring 150 is larger than the maximum inside diameter 144 of the interior surface 138, and the minimum outside diameter 159 of the outer surface 152 is larger than the minimum inside diameter 139, but smaller than the maximum inside diameter 144 of the surface 138. Prior to tightening of the closure 100, the seal ring 150 is disposed against the surface 138 with the lip 156 and the annular surface 160 of seal ring 150 spaced apart from the face 142 and the shoulder 136, respectively. The female member 104 is thus free to swivel or pivot with respect to the male member 102 by virtue of the matching sphericity of the engaged surfaces 112, 154. When the male and female members 102, 104 are in the desired pivotal alignment, they are urged toward each other by tightening the nuts 182, 184 on the bolts 178. This displaces the female member 104 with respect to the male member 102 and the seal ring 150. The lip 156 desirably serves as a visual indication of proper tightening of the bolts 178 by permitting observation between the flanges 170, 172 of the abutment of the lip 156 on the seal ring 150 against the face 142 of the female member 104. Since the axial extent of the frustoconical surfaces 138, 152 are substantially equal, the abutment of the lip 156 against the surface 142 corresponds to a like abutment of the surface 160 against the shoulder 136. The urging of the female member 104 towards the male member 102 in this manner obtains a radial compression of the seal ring 150 by the surface 138 of the female member 104 against the surface 152 of the seal ring 150. This compression serves to effect a seal between the surfaces 138, 152 and the surfaces 112, 154, and to lock the male and female members 102, 104 into relative swiveled position with respect to each other.

The swivel connector 100 may, of course, be employed when the male and female tubular members 102, 104 are coaxially aligned as illustrated in FIG. 1. However, the swivel flow line connector 100 is more advantageously employed in situations wherein the longitudinal axis 120 of the male member 102 is not coincident with the axis 140 of the female member 104, i.e., when there is axial misalignment. A misaligned connection is shown in FIG. 2 in which like numerals are used to designate like parts appearing in FIG. 1. In the misaligned position illustrated in FIG. 2, the axis 120 of the male member 102 is generally disposed at an angle relative to the axis 140 of the female member 104. Because of the generally matching curvature of the surface 112 on the male member end portion 110 and the face 134 on the female member 104, the axes 120, 140 will normally intersect at a point adjacent the fixed point 118 at an angle of misalignment shown as in FIG. 2. Because of this misalignment, the upper flange portions 170a, 172a are spaced further apart than the bottom flange portions 170b, 172b. Similarly, the upper seal ring portion 150a is disposed adjacent the minimum outside diameter 114 of the exterior surface 112, while the seal ring lower portion 150b is adjacent the maximum outside diameter 116. The bolt 178a disposed in the upper flange portions 170a, 172a is also disposed adjacent the inside surfaces of radially divergent bores 174a, 176a, while the lower bolt 178b is disposed adjacent the outside surfaces of the bores 174b, 176b. The opposed flange surfaces 186b, 188 are radially tapered outwardly to facilitate observation of the abutment of the lip 156 and the face 142 at the more closely spaced lower flange portions 186b, 188b.

The radial compression of the seal ring 150 creates a fluid tight seal around the periphery of the male member end portion 110, while at the same time inhibiting realignment or movement of the male member 102 with respect to the female member 104. The radially diverging surface 126 of male member end portion 110 preferably diverges at an angle with respect to the axis 120 corresponding to the angle at the full misalignment of male member 102 with respect to female member 104 so that there is no fluid flow restriction even at maximum misalignment.

In some instances, it may be desirable to facilitate alignment of the bores of the male member flange with those of the female member flange. This is provided for in the alternate embodiment illustrated in FIG. 3 in which similar parts corresponding to those of FIGS. 1 and 2 are designated by correspondence of the last two digits in reference numerals. In the connection 200, the flange 270 associated with the male member 202 is lapped with end portion 210. The flange 272 is similar to flange 172 illustrated in FIGS. 1 and 2, but is provided as a separate piece rotatable about the exterior surface 201 of the male member 202. The flange 270 is annular and has an inside diameter at face 203 which is sufficiently large to allow rotation around the surface 201 of the male member 202. The male member 202 is provided with an external rearward shoulder 203 which extends radially from the surface 201 to generally cylindrical external surface 205 which may conveniently have an outside diameter corresponding to the maximum outside diameter 216 of the annular spherical surface 212. The flange 270 is further provided with a cylindrical surface 207 which extends axially from the flange face 288 to shoulder 209 which extends radially inwardly to cylindrical surface 211. There is preferably an annular recess 213 formed in the surface 205 adjacent the surface 209 to locally relieve stress induced by tightening of the bolts 278. A stop ring 215 may be provided around the periphery of the surface 201 spaced from the flange 272 to maintain the flange 272 adjacent the end portion 210 and prevent substantial movement of the flange 272 from the end 210 as might otherwise occur during installation or handling when the male member 202 is positioned vertically prior to placement of the bolts 278 and the nuts 182, 184. This embodiment allows for rotation of the flange 270 with respect to the male tubular member 202 in order to facilitate alignment of the bolt holes 274 with the bolt holes 276 in the opposed female tubular member flange 272. Alternate embodiments are also contemplated wherein a lapped flange is similarly mounted on the female member in place of the fixed flange 272, and wherein both of the flanges 270, 272 are lapped flanges.

Figure 4:
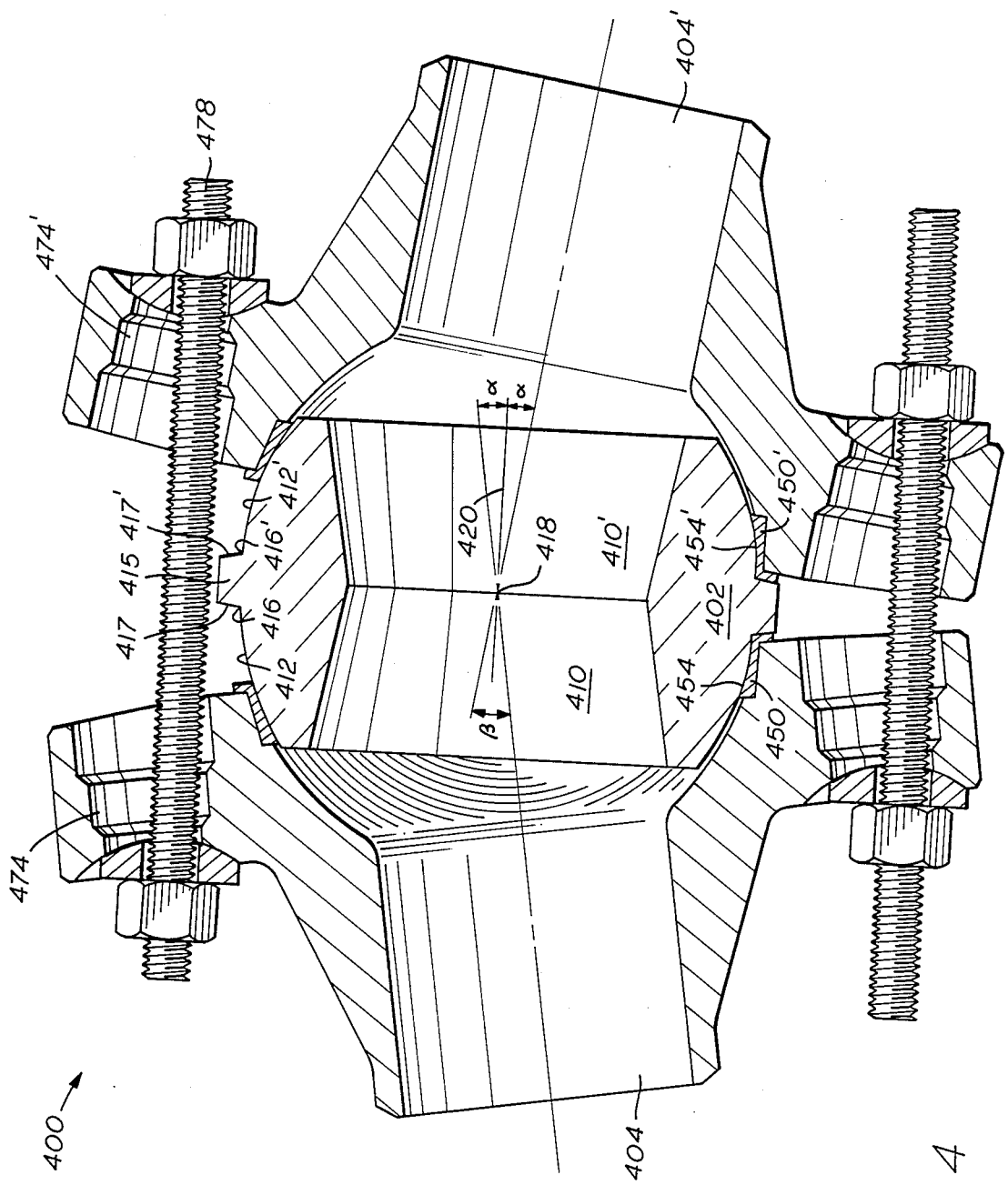
FIG. 4 is an axial section of another embodiment of the swivel flow line connector of the present invention in which a male member is positioned between two female members thereof.

Another embodiment of the swivel flow line connector of the present invention is illustrated in FIG. 4 in which like parts similar to those seen in the flow line connector of FIG. 1 are indicated by a correspondence of the last two digits in reference numerals. In this embodiment, the swivel flow line connector 400 is provided with mirror image opposed female tubular members 404, 404' between which is a matingly disposed male member or ball 402. The male member 402 is generally symmetrical with respect to a central plane transverse to axis 420 thereof so that the end portion 410 generally matingly engaged with the female tubular member 404 is symmetric to the end portion 410' similarly engaged in the female member 404'. The male member 402 is provided with spherical surfaces 412, 412' for respective engagement with the concave spherical surfaces 454, 454' of the respective seal rings 450, 450'. The ball member 402 is provided with a peripheral rim 415 with annular shoulders 417, 417' extending radially outwardly from the respective surfaces 412, 412' adjacent maximum outside diameters 416, 416', respectively. The shoulders 417, 417' should not extend radially to the extent that they interfere with the projection of the bolts 478 through the bores 474, 474' when the swivel connector 400 is in a fully misaligned position.

Figure 3:
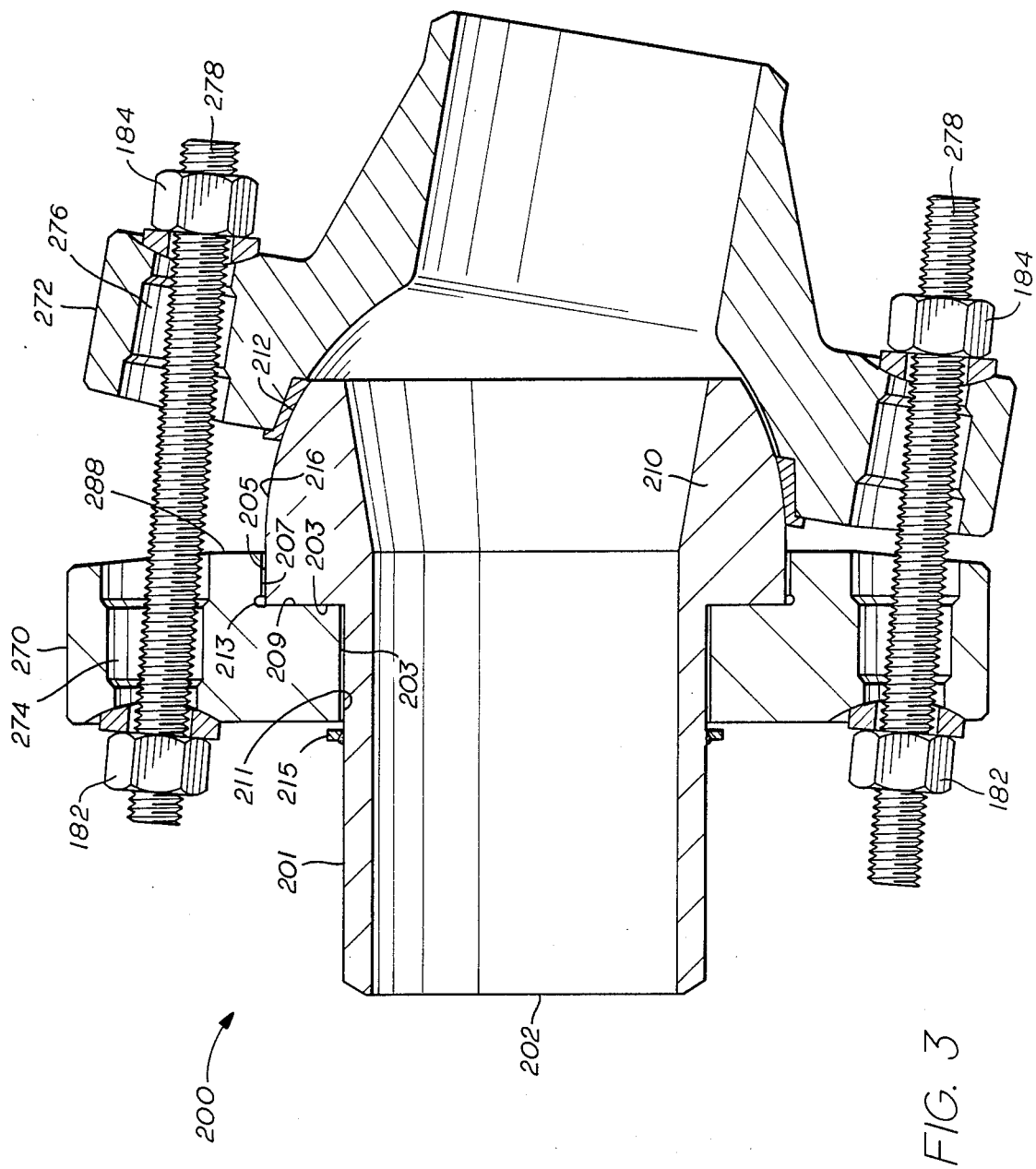
FIG. 3 is an axial section of another embodiment of a flow line connector according to the present invention in which the male member thereof is provided with a slip flange.

The swivel connector 400 is advantageously employed when the angle of misalignment permitted by the embodiments of FIGS. 1–3 is not sufficient in a particular application. Use of the ball connector 400 permits a misalignment angle β which is approximately twice that of the misalignment angle in FIGS. 1–3 when the other dimensions of the corresponding parts remain unchanged.

For example, when a section of pipeline is replaced, the replacement section may be connected to the old pipeline using a swivel flow line connector 100 or 200 at either end of the replacement section, and employing the swivel ball connector 400 at the approximate midpoint of the replacement section.

Figure 6:
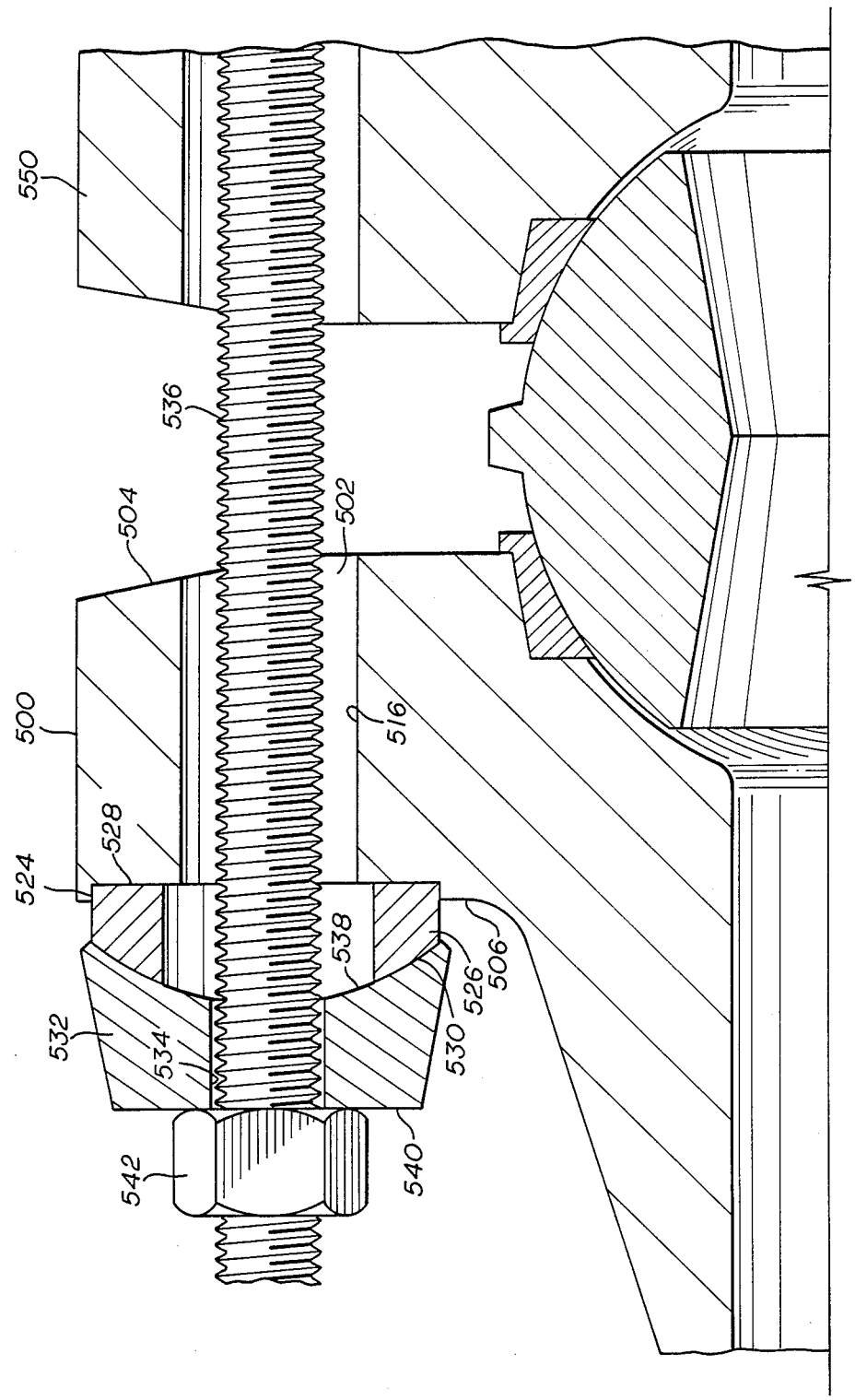
FIG. 6 is a partial axial section of an alternate embodiment of a flange bolting arrangement for use in a swivel flow line connector according to the present invention.
Figure 7:
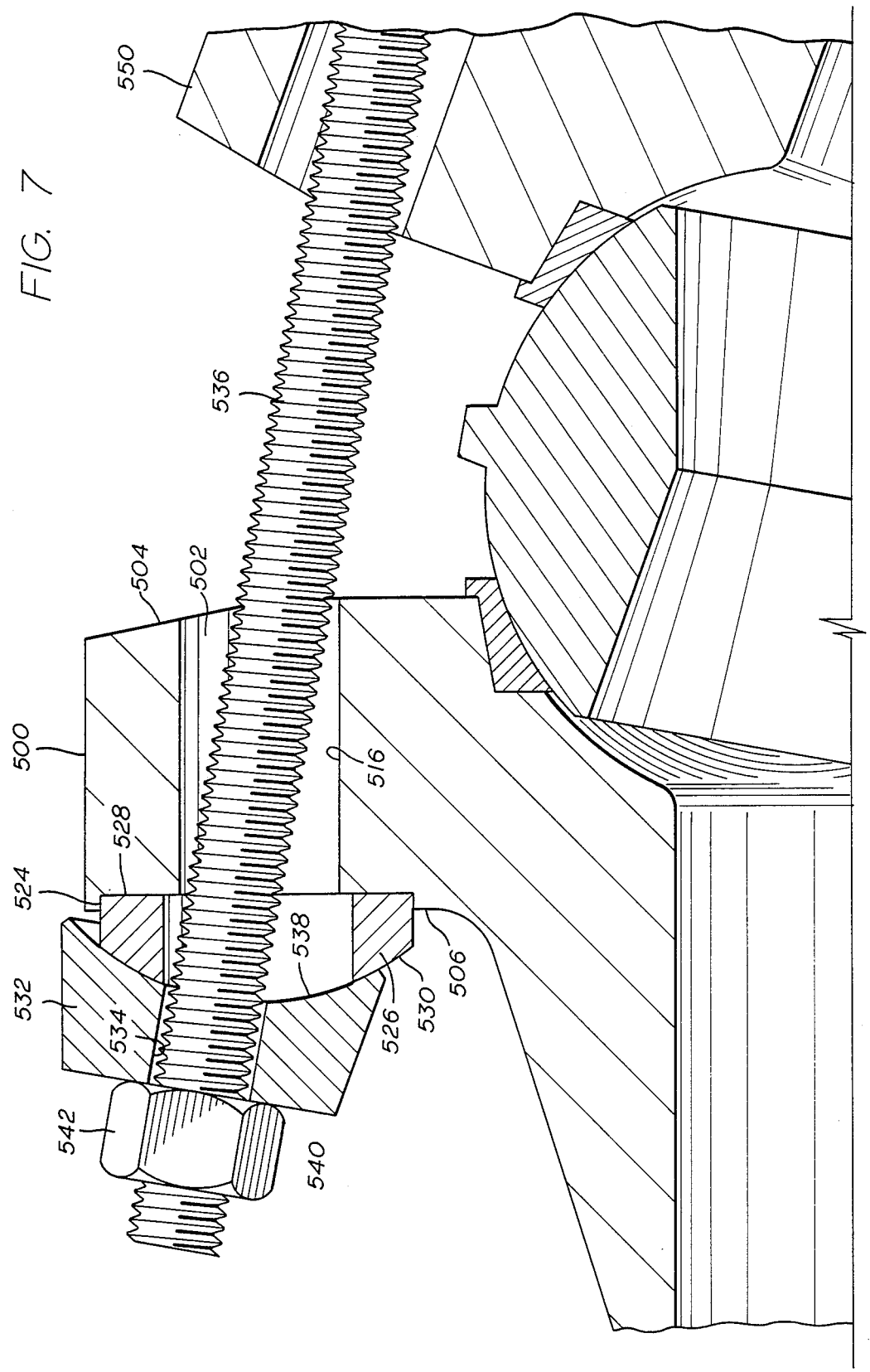
FIG. 7 is a partial axial section of the bolting arrangement seen in FIG. 6 in full misalignment.

An alternative bolting arrangement for the flanges of the swivel flow line connector of the present invention, particularly for use with the swivel ball connector 400, is illustrated in FIGS. 6–7. In this embodiment, the flange 500 is generally annular and may be fixedly or rotatably secured to a male or female tubular member of a swivel flow line connector as described hereinabove. A bore 502 extends axially from outwardly tapered leading surface 504 to the trailing surface 506 and has a cylindrical surface 516 with a uniform inside diameter. Adjacent the surface 506, there is formed an annular recess 524 concentric with the bore 502 which receives annular spacer element 526 which has an outside diameter complementary thereto. The annular spacer element 526 has an annular face 528 in abutment with the recess 524, and an opposite convex annular face 530 projected above the depth of the recess 524 to extend from the face 506. An annular crown 532 is disposed generally concentrically with the element 526 adjacent the convex surface 530. The crown 532 is provided with a central bore 534 which has an inside diameter which is at least as large as the bolt 536 received therethrough, but generally less than that of spacer element 526. The crown 532 is provided with a concave annular surface 538 which is generally spherical and of matching curvature to engage the surface 530 of the spacer element 526. A generally flat annular surface 540 is opposite therefrom. The bolt 536 is disposed axially through the bore 502, the spacer element 526 and the crown 532 and is similarly engaged in the opposed flange 550 on the adjacent mating member. The bolt 536 is secured by means of a nut 542 threadedly received thereon.

When the flanges 500, 550 are bolted together by means of the bolt 536 and the nut 542 in substantial axial alignment, the bolt or stud 536 is generally coaxial with the bore 502, the spacer element 526 and the crown 530 as illustrated in FIG. 6. However, when the flow line connector 500 is in a misaligned position, the bolt 536 is similarly misaligned in the bore 502 as illustrated in FIG. 7. In this misaligned configuration, the bolt 536 is pivoted in the bore 502 and there is generally radial displacement of the surface 538 of the crown 532 with respect to the surface 530 of the spacer element 526. This embodiment is advantageous in that the arrangement allows for more misalignment of the bolt 536 with a relatively smaller diameter of the bore surface 516.

The relative dimensions of the sealing surfaces and the seal ring in the swivel flow line connector in the present invention, all of which are generally subject to manufacturing tolerances, will depend in large part upon various factors such as the diameter of the tubular members, materials of construction and fluid design pressures. The slope of the interior sealing surface of the female member will, in any case, generally be less than twenty degrees with respect to the longitudinal axis of the female tubular member, and is preferably about ten degrees, or less. If this slope is too great, there is a danger that the seal ring may fracture from too much radial compression, or that there will not be a sufficient gap between the lip of the seal ring and the opposed, abutting face of the female member flange to permit visual observation of proper tightening of the flange bolts. On the other hand, if the taper of the seal ring outer surface is too small, excessive axial displacement of the female member with respect thereto may be required to obtain sufficient radial compression of the seal ring to effect a fluid tight seal therebetween.

Having described the invention above, many variations in the size, shape, configurations and materials will become apparent to those skilled in the art. It is intended that all such variations which fall within the scope and spirit of the appended claims be embraced thereby.

What is claimed is:

1. Apparatus for making a swiveled flow line connection, comprising:
    a male member having an annular end portion with a convex curved exterior sealing surface, a maximum outside diameter and a terminus adjacent a minimum outside diameter of said surface;
    a female member generally matingly pivotable with said male member and having an annular end portion with an outwardly tapered frustoconical interior surface with a slope with respect to a longitudinal axis of said female member less than that of said male member end portion exterior surface, said frustoconical interior surface terminating at a maximum inside diameter thereof and extending axially to a radially inwardly projecting shoulder at a minimum inside diameter;
    a seal ring having a frustoconical outer surface with a slope substantially equal to that of said female member interior surface for sealing engagement therewith, an inner concave annular surface with a curvature substantially equal to that of said male member exterior surface for sealing engagement therewith, a lip extending radially outwardly from said seal ring outer surface adjacent a maximum outside diameter thereof, said seal ring outer surface maximum outside diameter being greater than said female member end portion interior surface maximum inside diameter, and a maximum inside diameter of said seal ring inner surface less than said male member end portion exterior surface maximum outside diameter, said seal ring having an annular face extending radially outwardly from said seal ring inner surface minimum inside diameter to said seal ring outer surface minimum outside diameter, said seal ring annular face having a radial dimension at least as large as that of said radially inwardly projecting female member end portion shoulder; and
    means for urging said male and female members toward each other in pivoted alignment to compress said seal ring between said respective male and female end portion surfaces to form a fluid seal there-between.

2. The apparatus of claim 1, wherein
said seal ring outer surface has an axial dimension from said minimum outside diameter of said surface to said maximum outside diameter of said surface,
said axial dimension of said outer surface of said seal ring being substantially equal to said axial extent of said interior surface of said female member end portion.

3. The apparatus of claim 2, wherein
said male member annular end portion has a radially outwardly diverging central bore for conducting a fluid therethrough.

4. The apparatus of claim 2, wherein
said radial divergence of said central bore defines a frustoconical surface with a taper angle with respect to the longitudinal axis of said male member corresponding to a maximum misalignment angle between said male and female members.

5. The apparatus of claim 2, wherein
said urging means includes opposed annular flanges operatively associated with said respective male and female members.

6. The apparatus of claim 5, wherein
said flanges are fixedly formed on said respective end portions of said male and female members.

7. The apparatus of claim 5, wherein
said male member end portion flange is rotatably secured thereto.

8. The apparatus of claim 5, wherein
each of said flanges is provided with a like plurality of peripherally positioned bores extending axially therethrough in general mutual register for receiving a common bolt.

9. The apparatus of claim 8, wherein
said peripheral flange bores diverge radially outwardly to opposed faces of each flange.

10. The apparatus of claim 9, wherein
said flanges are provided with a spherically concave annular bolt seating surface formed coaxially with each said peripheral flange bore at the faces of said flanges adjacent a minimum inside diameter of said peripheral bores;
and wherein said urging means further includes a plurality of annular collars with a spherically convex annular leading surface for engagement with each said bolt seating surface, an axial bore formed therethrough for receiving a bolt;
bolts receivable through said peripheral flange bores and said collars; and
nuts threadedly engagable with opposite ends of said bolts.

11. The apparatus of claim 8, wherein
a cylindrical recess is formed coaxial with each peripheral flange bore having an inside diameter greater than a minimum inside diameter of said peripheral flange bores;
and wherein said urging means further includes a plurality of annular spacer elements with an outside diameter substantially similar to that of said coaxial recesses for being received therein, a central bore having an inside diameter at least as large as a minimum inside diameter of said peripheral flange bores, and a convex annular face projected above said recess when received therein;

a plurality of annular crowns having a central bore with an inside diameter for receiving a bolt and a concave annular surface of substantially matching curvature with respect to said convex surface of said spacer elements for engagement therewith; and
a plurality of bolts corresponding to each peripheral flange bore and receivable by said flange bores, said spacer element and said crown.

12. The apparatus of claim 2, wherein
said seal ring inner surface has a minimum inside diameter larger than said minimum outside diameter of said male member end portion exterior surface.

13. The apparatus of claim 2, wherein
said female member has a central bore formed therein for flow of fluid therethrough,
said central bore diverging radially outwardly at a face having a radius of curvature substantially corresponding to that of said male member end portion exterior surface to permit pivoting with respect thereto,
said radially outwardly diverging face terminating at said female member end portion shoulder.

14. The apparatus of claim 2, wherein
said compression of said seal ring by said urging means locks said male and female members into pivoted alignment.

15. A swivel flow line connection, comprising:
a male member having a longitudinal axis and an annular end portion with a curved convex exterior sealing surface, a maximum outside diameter and a terminus adjacent a minimum outside diameter of said surface;
a female member generally matingly pivoted with respect to said male member and having an annular end portion with an outwardly tapered frustoconical interior surface with a slope with respect to a longitudinal axis of the female member less than that of a line tangent to said male member end portion exterior surface, said frustoconical surface terminating at a maximum inside diameter thereof at a radially outwardly extending face and extending axially to a radially inwardly projecting shoulder adjacent a minimum inside diameter thereof;
an annular seal ring radially compressed between said male member end portion exterior surface and said female member end portion interior surface, said seal ring having a frustoconical outer surface with a slope and axial extent substantially equal to that of said male member end portion interior surface and in sealing engagement therewith, said seal ring having a concave inner annular surface with a curvature substantially equal to that of said male member end portion exterior surface and in sealing engagement therewith, a lip extending radially outwardly from said seal ring outer surface adjacent a maximum outside diameter thereof in abutment with said female member end portion outwardly extending face, an annular end surface extending radially between said inner and outer seal ring surfaces at minimum diameters thereof in abutment with said female member end portion radially inwardly extending shoulder, said annular end surface having a radial dimension at least as large as that of said radially inwardly projecting female member end portion shoulder, said seal ring outer surface having a maximum outside diameter in a relaxed condition greater than said female member end portion interior surface maximum inside diameter, and said seal ring inner surface having a maximum inside diameter less than said male member end portion exterior surface maximum outside diameter; and means for maintaining said male and female end portions and said seal ring in relative disposition.

16. The flow line connection of claim 15, wherein said male member annular end portion has a radially outwardly diverging central bore for conducting a fluid therethrough.

17. The flow line connection of claim 16, wherein said radial divergence of said central bore defines a frustoconical surface with a taper angle with respect to said longitudinal axis of said male member corresponding to a maximum misalignment angle between said male and female members.

18. The flow line connection of claim 15, wherein said maintaining means includes opposed annular flanges operatively associated with said respective male and female members.

19. The flow line connection of claim 18, wherein said flanges are fixedly formed on said respective end portions of said male and female members.

20. The flow line connection of claim 18, wherein said male member end portion flange is rotatably secured thereto.

21. The flow line connection of claim 18, wherein each of said flanges is provided with a like plurality of peripherally positioned bores extending axially therethrough in general mutual register and receiving a common bolt.

22. The flow line connection of claim 21, wherein said peripheral flange bores diverge radially outwardly to opposed faces of each flange.

23. The flow line connection of claim 22, wherein said flanges are provided with spherically concave annular bolt seating surfaces respectively formed coaxially with each said peripheral flange bore at faces of said flanges adjacent a minimum inside diameter of said peripheral bores;

and wherein said maintaining means further includes a plurality of annular collars with a spherically convex annular leading surface for engagement with each said bolt seating surface, and an axial bore formed therethrough receiving said bolt; and nuts threadedly engaged at opposite ends of said bolts.

24. The flow line connection of claim 22, wherein a cylindrical recess is formed coaxial with each peripheral flange bore having an inside diameter greater than a minimum inside diameter of said peripheral flange bores;

and wherein said maintaining means further includes a plurality of annular spacer elements with an outside diameter substantially similar to that of said coaxial recesses and received therein, a central bore receiving said bolt having an inside diameter at least as large as a minimum inside diameter of said peripheral flange bores, and a convex annular face projected above said recess; and a plurality of annular crowns having a central bore with an inside diameter receiving said bolt and a concave annular surface of substantially matching curvature with respect to said convex surface of said spacer elements in engagement therewith.

25. The flow line connection of claim 15, wherein said seal ring inner surface has a minimum inside diameter larger than said minimum outside diameter of said male member end portion exterior surface.

26. The flow line connection of claim 15, wherein said female member has a central bore formed therein for flow of a fluid therethrough;

said central bore diverging radially outwardly at a face having a radius of curvature substantially corresponding to that of said male member end portion exterior surface, said radially outwardly diverging face terminating at said female member end portion shoulder.

27. The flow line connection of claim 15, wherein said male and female members are locked into pivotal alignment by said compression of said seal ring.

28. Apparatus for making a swiveled flow line connection, comprising:

an annular ball member having longitudinally opposite first and second male end portions and a peripheral rim positioned therebetween transverse to a longitudinal axis of said ball member, each said end portion having a curved convex exterior sealing surface, a maximum outside diameter adjacent said rim, and a terminus adjacent a minimum outside diameter of said surface;

first and second tubular female members, each having a respective annular end portion generally matingly pivotable with said first and second ball member end portions, each of said female member end portions having an outwardly tapered frustoconical interior surface with a slope with respect to a longitudinal axis of said respective female member end portion less than that of said respective ball member end portion exterior surface, said frustoconical interior surface terminating at a radially outwardly extending face adjacent a maximum inside diameter thereof and extending axially to a radially inwardly projecting shoulder adjacent a minimum inside diameter thereof;

first and second respective seal rings, each having a frustoconical outer surface with a slope substantially equal to that of said respective female member interior surface for sealing engagement therewith, an inner concave annular surface with a uniform radius of curvature substantially equal to that of said respective ball member exterior surface for sealing engagement therewith, a lip extending radially outwardly from said seal ring outer surface adjacent a maximum outside diameter thereof, said seal ring outer surface maximum outside diameter being greater than said respective female member end portion interior surface maximum outside diameter, and a maximum inside diameter of said seal ring inner surface less than said respective ball member end portion exterior surface maximum outside diameter, said seal ring having an annular face extending respectively radially outwardly from said seal ring inner surface minimum inside diameter to said seal ring outer surface minimum outside diameter, said seal ring annular face having a radial dimension at least as large as that of said radially inwardly projecting female member end portion shoulder; and means for urging said female members toward each other in pivoted alignment with respect to said ball member to compress said seal rings between said respective male and female end portion surfaces to form a fluid seal therebetween.

29. The apparatus of claim 28, wherein
said seal ring outer surfaces have an axial dimension from said minimum outside diameter of said respective surface to said maximum outside diameter of said respective surface, said axial dimension of said outer surface of said seal rings being substantially equal to said axial extent of said interior surfaces of said respective female member end portions.

30. The apparatus of claim 29, wherein
said ball member annular end portions each have a radially outwardly diverging central bore for conducting a fluid therethrough.

31. The apparatus of claim 30, wherein
said radial divergence of said central bore defines a frustoconical surface with a taper angle with respect to the longitudinal axis of said ball member corresponding to a maximum misalignment angle between said female members and said ball member.

32. The appartus of claim 29, wherein
said urging means includes opposed annular flanges operatively associated with said female members.

33. The apparatus of claim 32, wherein
said flanges are fixedly formed on said respective end portions of said female members.

34. The apparatus of claim 32, wherein
said flanges are rotatably secured to said respective female member end portions.

35. The apparatus of claim 32, wherein
each of said flanges is provided with a like plurality of peripherally positioned bores extending axially therethrough in general mutual register for receiving a common bolt.

36. The apparatus of claim 35, wherein
said peripheral flange bores diverge radially outwardly to opposed faces of each flange.

37. The apparatus of claim 36, wherein
said flanges are provided with a spherically concave annular bolt seating surface formed coaxially with each peripheral flange bore at the faces of said flanges adjacent a minimum inside diameter of said peripheral bores;
and wherein said urging means further includes a plurality of annular collars with a spherically convex annular leading surface for engagement with each said bolt seating surface, an axial bore formed therethrough for receiving a bolt;
bolts receivable through said peripheral flange bores and said collars; and
nuts threadedly engageable with opposite ends of said bolts.

38. The apparatus of claim 35, wherein
a cylindrical recess is formed coaxial with each peripheral flange bore having an inside diameter greater than a minimum inside diameter of said peripheral flange bores;
and wherein said urging means further includes a plurality of annular spacer elements with an outside diameter substantially similar to that of said coaxial recesses for being received therein, a central bore having an inside diameter at least as large as a minimum inside diameter of said peripheral flange bores, and a convex annular face projected above said recesses when received therein;
a plurality of annular crowns having a central bore with an inside diameter for receiving a bolt and a concave annular surface of substantially matching curvature with respect to said convex surface of said spacer elements for engagement therewith; and
a plurality of bolts corresponding to each peripheral flange bore and receivable by said flange bores, said spacer element and said crown.

39. The apparatus of claim 29, wherein
said seal ring inner surface has a minimum inside diameter larger than said minimum outside diameter of said ball member end portion exterior surfaces.

40. The apparatus of claim 29, wherein
each female member has a central bore formed therein for flow of fluid therethrough;
each central bore diverging radially outwardly at a face having a radius of curvature substantially corresponding to that of said respective ball member end portion exterior surface to permit pivoting with respect thereto, said radially outwardly diverging face terminating at said female member end portion shoulder.

41. The apparatus of claim 29, wherein
said compression of said seal ring by said urging means locks said ball and female members into pivoted alignment.

* * * * *